United States Patent
Nakagawa (10) Patent No.: US 11,580,620 B2
(45) Date of Patent: Feb. 14, 2023

(54) IMAGE PROCESSING APPARATUS, IMAGE PROCESSING METHOD, AND NON-TRANSITORY COMPUTER-READABLE MEDIUM

(71) Applicant: CANON KABUSHIKI KAISHA, Tokyo (JP)

(72) Inventor: Daiki Nakagawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 126 days.

(21) Appl. No.: 17/092,367

(22) Filed: Nov. 9, 2020

(65) Prior Publication Data

US 2021/0158487 A1 May 27, 2021

(30) Foreign Application Priority Data

Nov. 22, 2019 (JP) .............................. JP2019-211709

(51) Int. Cl.
*G06T 5/00* (2006.01)
*G06T 3/40* (2006.01)

(52) U.S. Cl.
CPC ............ *G06T 5/002* (2013.01); *G06T 3/4015* (2013.01); *G06T 2207/10024* (2013.01)

(58) Field of Classification Search
CPC .............. G06T 5/002; G06T 3/4015; G06T 2207/10024; G06T 2207/20028; H04N 2209/046; H04N 9/646; H04N 9/04515
See application file for complete search history.

(56) References Cited

U.S. PATENT DOCUMENTS

| | | | |
|---|---|---|---|
| 6,937,775 B2 * | 8/2005 | Gindele | G06T 5/009 |
| | | | 382/284 |
| 8,559,744 B2 | 10/2013 | Cao et al. | |
| 10,559,073 B2 * | 2/2020 | Nishimura | G06T 5/002 |
| 2003/0021474 A1 | 1/2003 | Hunter et al. | |
| 2021/0133934 A1 | 5/2021 | Kaneko et al. | |

FOREIGN PATENT DOCUMENTS

JP    2013-026669 A    2/2013

OTHER PUBLICATIONS

Zhang et al., "PCA-Based Spatially Adaptive Denoising of CFA Images for Single-Sensor Digital Cameras" IEEE Transactions on Image Processing, vol. 18, No. 4, Apr. 2009, pp. 797-812.
Extended European Search Report issued by the European Patent Office dated Mar. 4, 2021 in corresponding EP Patent Application No. 20206863.1.

* cited by examiner

*Primary Examiner* — Phuoc Tran
(74) *Attorney, Agent, or Firm* — Carter, DeLuca & Farrell LLP (57) ABSTRACT

There is provided with an image processing apparatus. A noise reduction unit generates a noise-reduced image in which noise is reduced from an input image in which a plurality of types of pixels that represent mutually different types of color information are arranged in one plane. An extraction unit generates a high-frequency emphasized image in which a high-frequency component of the input image is emphasized. A demosaicing unit generates a demosaiced image having a plurality of planes that each represent one type of color information by demosaicing processing to the noise-reduced image. A generation unit generates an output image by correcting the demosaiced image by using the high-frequency emphasized image.

17 Claims, 9 Drawing Sheets

IMAGE PROCESSING APPARATUS, IMAGE PROCESSING METHOD, AND NON-TRANSITORY COMPUTER-READABLE MEDIUM

BACKGROUND OF THE INVENTION

Field of the Invention

The present invention relates to an image processing apparatus, an image processing method, and a computer-readable medium, and in particular to noise reduction processing on an image.

Description of the Related Art

Noise is included in a digital image obtained by image capturing using an image capturing apparatus or the like. Noise reduction processing on an image for reducing such noise is known. Japanese Patent Laid-Open No. 2013-026669 discloses a method of reducing noise of a captured image by generating a set of patches from a captured image, performing noise reduction processing on all patches belonging to the set of patches, and performing compositing processing on the patches after the noise reduction processing.

SUMMARY OF THE INVENTION

According to an embodiment of the present invention, an image processing apparatus comprises: a noise reduction unit configured to generate a noise-reduced image in which noise is reduced from an input image in which a plurality of types of pixels that represent mutually different types of color information are arranged in one plane; an extraction unit configured to generate a high-frequency emphasized image in which a high-frequency component of the input image is emphasized; a demosaicing unit configured to generate a demosaiced image having a plurality of planes that each represent one type of color information by demosaicing processing to the noise-reduced image; and a generation unit configured to generate an output image by correcting the demosaiced image by using the high-frequency emphasized image.

According to another embodiment of the present invention, an image processing method comprises: generating a noise-reduced image in which noise is reduced from an input image in which a plurality of types of pixels that represent mutually different types of color information are arranged in one plane; generating a high-frequency emphasized image in which a high-frequency component of the input image is emphasized; generating a demosaiced image having a plurality of planes that each represent one type of color information by demosaicing processing to the noise-reduced image; and generating an output image by correcting the demosaiced image by using the high-frequency emphasized image.

According to still another embodiment of the present invention, a non-transitory computer-readable medium stores a program which, when executed by a computer, causes the computer to perform a method comprising: generating a noise-reduced image in which noise is reduced from an input image in which a plurality of types of pixels that represent mutually different types of color information are arranged in one plane; generating a high-frequency emphasized image in which a high-frequency component of the input image is emphasized; generating a demosaiced image having a plurality of planes that each represent one type of color information by demosaicing processing to the noise-reduced image; and generating an output image by correcting the demosaiced image by using the high-frequency emphasized image.

Further features of the present invention will become apparent from the following description of exemplary embodiments (with reference to the attached drawings).

DESCRIPTION OF THE EMBODIMENTS

Hereinafter, embodiments will be described in detail with reference to the accompanying drawings. Not all features described in the exemplary embodiments are essential for the invention according to the scope of the claims. Although several features are described in the embodiments, these features are not all necessarily required for the invention, and multiple features may be combined as desired. Furthermore, in the accompanying drawings, the same or similar configurations are given the same reference signs, and redundant descriptions thereof will be omitted.

In conventional noise reduction processing, a high-frequency component may be lost in the course of processing. Accordingly, the user gets the impression that the sharpness of the image is reduced by the noise reduction processing.

An embodiment of the present invention can reduce noise of an image while inhibiting a reduction in sharpness.

First Embodiment

An image processing apparatus according to a first embodiment performs correction using a high-frequency emphasized image obtained by emphasizing a high-frequency component of an input image to an image obtained by performing noise reduction processing on an input image and then further performing demosaicing processing. By such a configuration, it is possible to reduce the noise of the image while inhibiting a reduction in sharpness.

Figure 1:
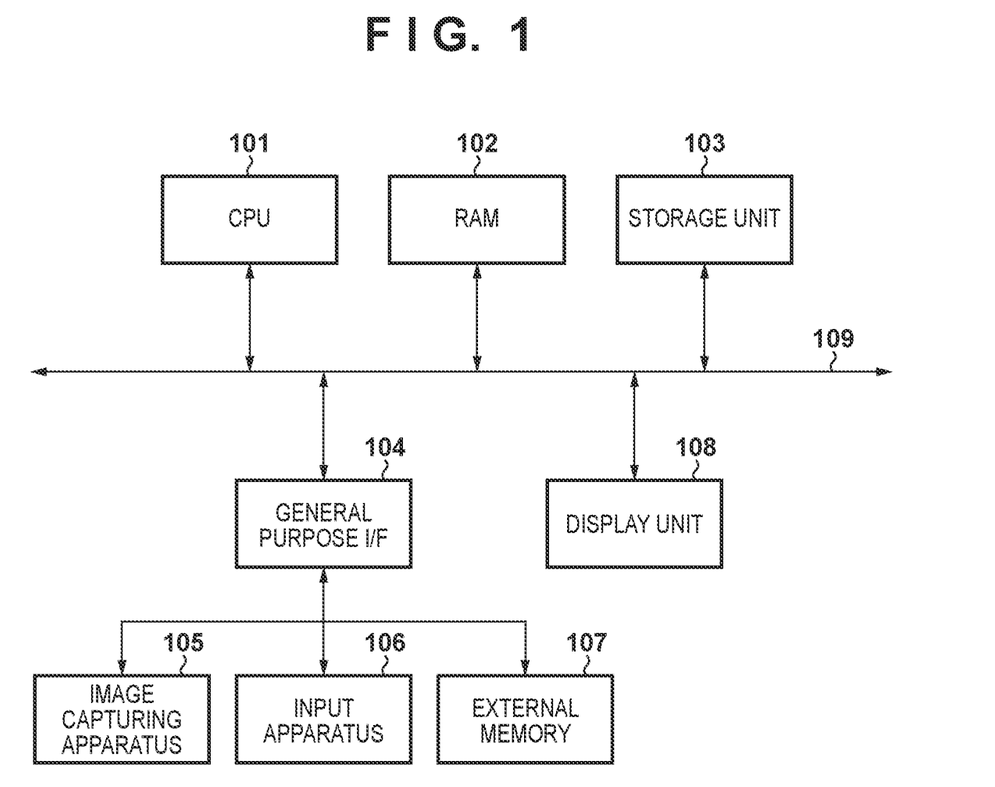
FIG. 1 is a view illustrating an example of a hardware configuration of an image processing apparatus according to one embodiment.
Figure 2:
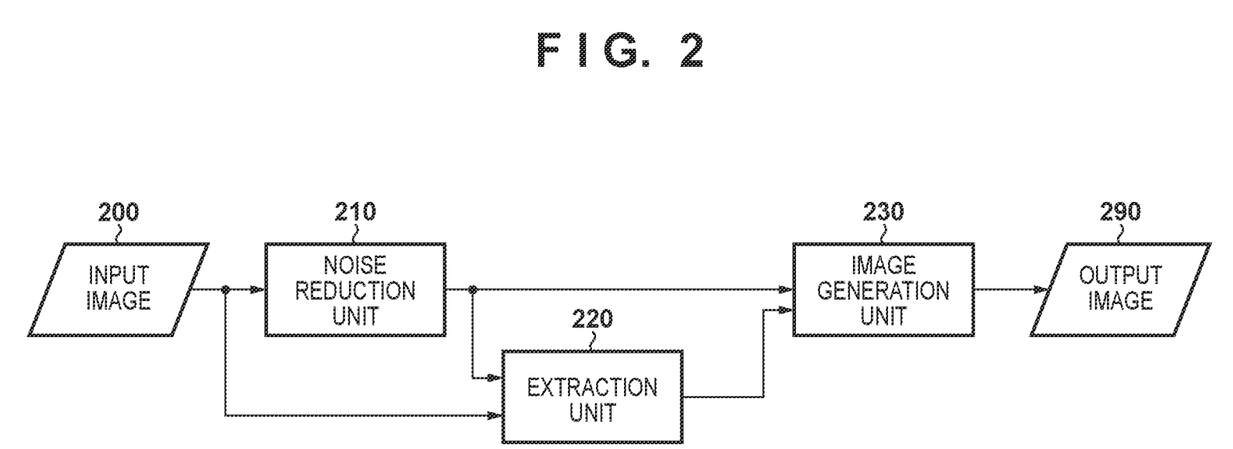
FIG. 2 is a view illustrating an example of a functional configuration of the image processing apparatus according to one embodiment.

The image processing apparatus according to the present embodiment can be realized by a computer comprising a processor and a memory. FIG. 1 is a block diagram illustrating an example of a hardware configuration of the image processing apparatus according to a first embodiment. The image processing apparatus illustrated in FIG. 1 comprises a CPU 101, a RAM 102, a storage unit 103, a general-purpose I/F (InterFace) 104, and a display unit 108. The respective configurations are connected to each other via a main bus 109. Also, via a general-purpose I/F 104, an image capturing apparatus 105, an input apparatus 106, and an external memory 107 are connected to the image processing apparatus.

The CPU 101 controls each configuration in accordance with an inputted image and a program for realizing later-described processing. The storage unit 103 is a storage medium such as an HDD or an SSD. In the storage unit 103, a computer program by which the CPU 101 executes each process is stored. The RAM 102 acts as a buffer memory for temporarily holding inputted image data or the like, or a working area or the like of the CPU 101. A processor such as the CPU 101 interprets and executes a program stored in a memory such as the RAM 102 or the storage unit 103, and by performing operations based on instructions thereof, can realize a function of each unit shown in the later-described FIG. 2 or the like.

The image capturing apparatus 105 is an apparatus for capturing images, such as a camera, and can input captured images it obtains into an information processing apparatus. The input apparatus 106 is an apparatus for receiving instructions and data, and for example, is an apparatus such as a mouse or a keyboard that a user uses to make instructions to the image processing apparatus. The external memory 107 is a storage medium for storing data such as a memory card or the like, for example. The display unit 108 is hardware that has a function of displaying information, and, for example, is a liquid crystal display or an organic EL display, or the like. The display unit 108 can display an image, or can display a user interface (UI) for a user to use to input a desired instruction. The image processing apparatus according to the present embodiment, in accordance with an instruction from a user inputted via a user interface and the input apparatus 106, can execute later-described processing to an image stored in the RAM 102. An image after noise reduction processing obtained by later-described processing is stored again in the RAM 102. It is possible to output the image resulting from the noise reduction processing that is stored in the RAM 102 to the display unit 108 or the external memory 107 in accordance with an instruction from a user.

FIG. 2 is a block diagram illustrating an example of a logical configuration of an image processing apparatus according to the present embodiment. The image processing apparatus according to the present embodiment comprises a noise reduction unit 210, an extraction unit 220, and an image generation unit 230.

The noise reduction unit 210 obtains an input image 200, and generates a noise-reduced image whose noise is reduced from the input image 200. The input image 200 is an image in which a plurality of types of pixels that represent mutually different types of color information are arranged in a single plane, and in the present embodiment the input image 200 is an image in a Raw format. A Raw format image is an image of one plane. The number of planes indicates how many types of information that each pixel has. A one-plane image has one type of information in each pixel, and a three-plane image has three types of information in each pixel. For example, an RGB image is a three-plane image, and an RGBα image is a four-plane image. In the present embodiment, the input image 200 is a Bayer array image, that is, an image obtained using image capturing elements of a Bayer array, but the input image 200 is not limited to a Bayer array image.

The method of noise reduction processing that the noise reduction unit 210 uses for noise reduction is not particularly limited. For example, the method described in Japanese Patent Laid-Open No. 2013-026669 may be employed. In the present embodiment, the noise reduction unit 210 performs noise reduction processing by using the following method. The noise reduction unit 210 first sets a region made up of a plurality of pixels in the input image 200 as a target patch, and for each target patch, generates a similar-patch group that is similar to the target patch. Next, the noise reduction unit 210 calculates an average value of the respective pixels of the similar patch group, and calculates a covariance matrix by taking the sum for all of the similar-patch groups of the product of two arbitrary pixel values of the respective similar patches. The noise reduction unit 210 obtains an eigenvalue and an eigenvector from this average value and the covariance matrix. Also, the noise reduction unit 210, based on the eigenvalue and the eigenvector, generates a basis matrix corresponding to a similar patch group. The noise reduction unit 210, based on the average value and basis matrix of the respective pixels, performs projection processing to a similar patch, and thereby performs noise removal for each similar patch, and obtains noise-removed patch groups. Also, the noise reduction unit 210, by compositing noise-removed patch groups, generates a noise-reduced image. Such compositing processing is referred to as aggregation or the like. Specifically, the noise reduction unit 210 can perform compositing processing by returning each of the noise-removed patch groups to an original patch position in the input image, and performing weight averaging based on an average or a similarity for a pixel where a plurality of patches overlap.

The extraction unit 220 generates a high-frequency emphasized image where a high-frequency component of the input image 200 is emphasized. A high-frequency emphasized image can include an edge component that is easily lost in the noise reduction processing, and may include a constant noise component. Accordingly, a high-frequency emphasized image can be referred to as an edge-noise-containing image. In the present embodiment, the extraction unit 220, based on the input image 200 and the noise-reduced image, extracts the high-frequency emphasized image.

Figure 3A:
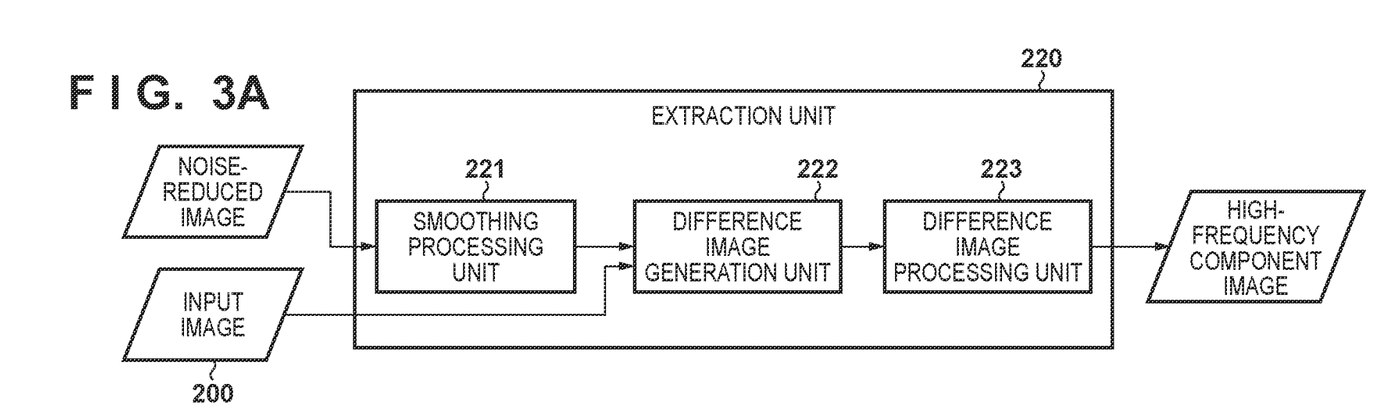
FIGS. 3A and 3B are views illustrating an example of a functional configuration of the image processing apparatus according to one embodiment.

The extraction unit 220 according to the present embodiment, as illustrated in FIG. 3A, comprises a smoothing processing unit 221, a difference image generation unit 222, and a difference image processing unit 223. The extraction unit 220 need not have all of these. For example, the smoothing processing unit 221 may be omitted.

The smoothing processing unit 221 performs smoothing processing to the noise-reduced image. For example, by performing a filter process, the smoothing processing unit 221 can perform noise-reduced image smoothing. Also, the smoothing processing unit 221 may perform smoothing processing that uses another method such as two-dimensional Fourier transform—high frequency mask—two-dimensional inverse Fourier transform. Here, the smoothing processing unit 221, by performing nonlinear processing that attenuates the high-frequency component, which takes advantage of a range filter or a bilateral filter or the like, may adaptively attenuate an edge component or a texture component.

Figure 4A:
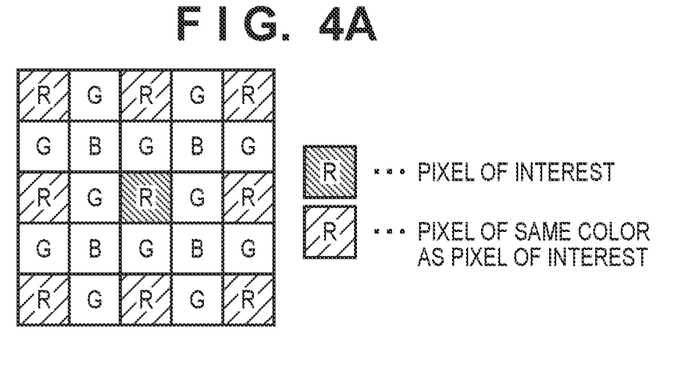
FIGS. 4A to 4C are views for describing an example of smoothing processing.
Figure 4B:
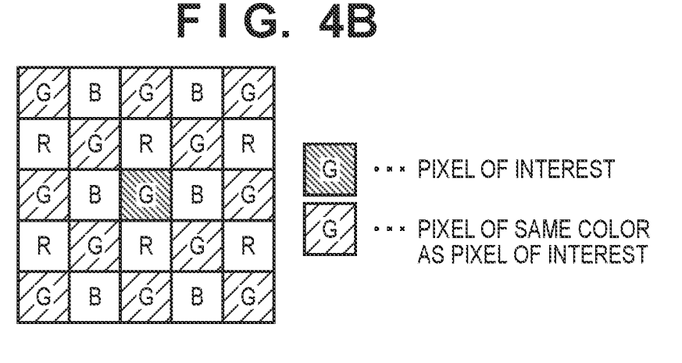
Figure 4C:
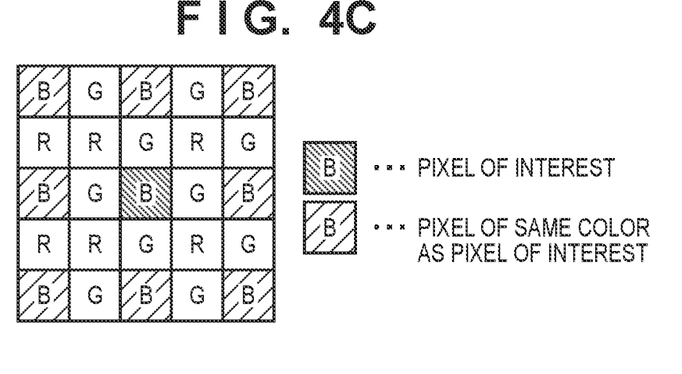

A specific processing example of the smoothing processing unit 221 is described below. The smoothing processing unit 221 sets a pixel of interest (i, j) in the noise-reduced image, and based on the pixel values of the pixels of the same color as the pixel of interest in a 5×5 pixel range centered on the pixel of interest and of the pixel of interest, obtains a weighted average value A(i, j) in accordance with Equation (1). In Equation (1), I(i, j) indicates a pixel value of a pixel(i, j). FIGS. 4A, 4B, and 4C illustrates, for cases where the pixels of interest are an R pixel, a G pixel, and a B pixel respectively, a positional relationship between a pixel of interest of a noise-reduced image which is a Bayer image and pixels of the same color as the pixel of interest. By repeating this processing while setting all pixels of the noise-reduced image sequentially as the pixel of interest, an image resulting from the smoothing processing having the weighted average value A(i, j) at pixel(i, j) is obtained.

$$A(i, j) = \frac{1}{N} \sum_m \sum_n \frac{I(i+m, j+n) * \frac{1}{2\pi\sigma} \exp\left(-\frac{[I(i, j) - I(i+m, j+n)]^2}{2\sigma^2}\right)}{\frac{1}{2\pi\sigma} \exp\left(-\frac{[I(i, j) - I(i+m, j+n)]^2}{2\sigma^2}\right)} \quad (1)$$

The difference image generation unit 222 generates a difference image for the input image 200 and an image resulting from the smoothing processing. The difference image generation unit 222 can obtain the difference image by subtracting the pixel value of the pixels of the image resulting from the smoothing processing from the pixel value of the pixels of the input image 200 at the same pixel position. The difference image indicates a difference between the input image 200 and an image obtained by performing noise reduction processing and smoothing processing on the input image 200. Since a high-frequency component (edge component and noise component) is attenuated by the noise reduction processing, the difference image indicates a high-frequency component (edge component and noise component) of the input image 200. Also, by the smoothing processing, since at least a subset of the edge component is reduced, it is possible to increase the edge component of the input image 200 that the difference image has by employing the smoothing processing unit 221 in the present embodiment. A difference image obtained in this way corresponds to a high-frequency emphasized image resulting from the high-frequency component of the input image 200 being emphasized. Using such a high-frequency emphasized image including an edge component, it is possible to improve the sharpness of the output image that is obtained by correcting the image resulting from the noise reduction processing as described below.

The difference image processing unit 223, for each pixel of a high-frequency emphasized image such as a difference image, performs a correction according to the type of the pixel. As described above, the input image in the present embodiment is an image in the Raw format. Each pixel of an image of the Raw format is classified into a plurality of types of pixels (for example, R, G, and B), and the pixel values of the pixels of the mutually different types are obtained by image capturing pixels (for example, R, G, and B) having mutually different spectral sensitivity characteristic. Accordingly, the difference image processing unit 223 generates a high-frequency component image by multiplying the gain value set for each pixel with the pixel value of each pixel of the difference image. In the present embodiment, for this gain, different values are used for each of the R pixel, the G pixel, and the B pixel. For example, as the gain, it is possible to use a white balance coefficient for each of the R pixel, the G pixel, and the B pixel.

As described later, in the present embodiment, correction of the image resulting from the demosaicing processing is performed using a high-frequency component image. Meanwhile, for a sensitivity difference of each RGB pixel, the difference image may have a checker board patterned pattern having light areas and dark areas according to a Bayer array. In this fashion, by performing a difference image correction, it is possible to inhibit the pattern having light areas and dark areas according to the Bayer array. Such a high-frequency component image obtained by correction of the difference image corresponds to a high-frequency emphasized image resulting from the high-frequency component of the input image 200 being emphasized.

First and foremost, it is possible to use, as the gain to be set for each pixel that the difference image processing unit 223 uses, other than a coefficient depending on a white balance coefficient, a coefficient decided in advance, a coefficient depending on an image height, or a coefficient depending on a pixel value, or the like.

Figure 3B:
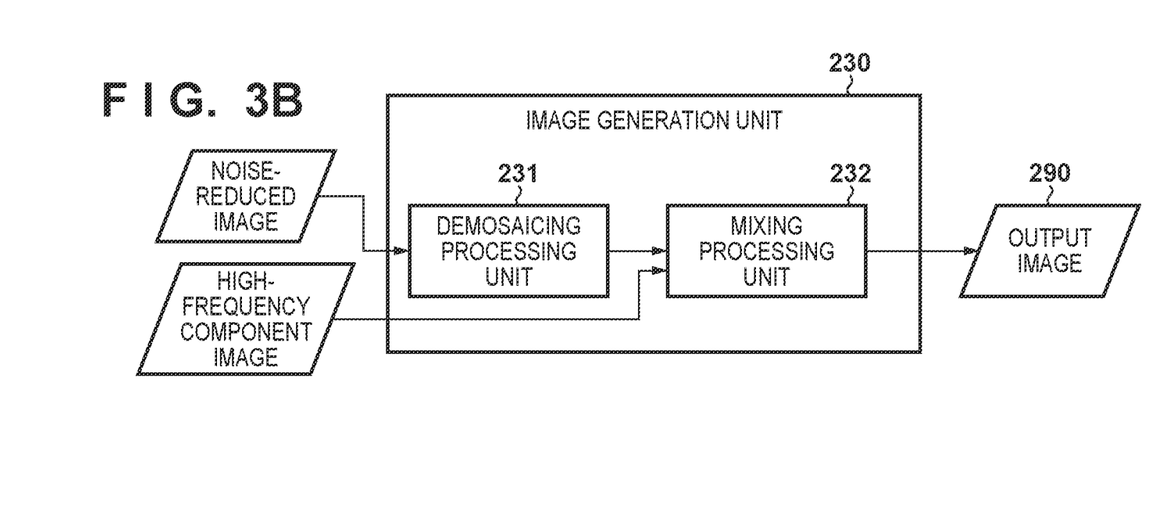

The image generation unit 230 generates an output image by correcting the demosaiced image obtained by the demosaicing processing on the noise-reduced image by using the high-frequency emphasized image. The image generation unit 230 according to the present embodiment has a demosaicing processing unit 231 and a mixing processing unit 232, as illustrated in FIG. 3B.

The demosaicing processing unit 231 performs demosaicing processing on the noise-reduced image. The demosaicing processing is processing for converting images having one plane into a demosaiced image having a plurality of planes that represents each type of color information. For example, the demosaicing processing unit 231 can convert the image in the Raw format into a YUV image, an L*a*b* image, an RGB image, or a YMCK image or the like.

In the present embodiment, the demosaicing processing unit 231 converts the noise-reduced image in the Raw format into the YUV format. Hereinafter, a specific processing example will be described. As described above, the input image 200 is a Bayer image, and therefore the noise-reduced image is also a Bayer image. The demosaicing processing unit 231, for the pixel of interest, decides colors other than the color of the pixel of interest by a linear interpolation using the eight surrounding neighboring pixels. For example, in the case where the pixel of interest is R (red), interpolation of G (green) and B (blue) is necessary.

In the case where G interpolation is performed, linear interpolation is performed using the four G pixels above/below/left/right of the pixel of interest. In the case where B interpolation is performed, linear interpolation is performed using the four B pixels right-diagonally above/right-diagonally below/left-diagonally above/left-diagonally below. As the result of such a linear interpolation, an RGB pixel value is obtained for the pixel of interest, in other words an RGB image, is generated. In the present embodiment, the demosaicing processing unit 231 converts an RGB image thus obtained into a YUV image. The conversion can be performed in accordance with Equations (1) through (3) by multiplying a coefficient with the pixel value of each pixel. In the present embodiment, the YUV image is obtained as a demosaiced image in this fashion.

$$Y = 0.2126 \times R + 0.7152 \times G + 0.0722 \times B \quad (1)$$

$$U = -0.114572 \times R - 0.385428 \times G + 0.5 \times B \quad (2)$$

$$V = 0.5 \times R - 0.454153 \times G - 0.045847 \times B \quad (3)$$

The mixing processing unit 232, using the high-frequency emphasized image, corrects a demosaiced image obtained by demosaicing processing by the demosaicing processing unit 231. Here, the mixing processing unit 232 can perform a correction by a different method to each plane of the demosaiced image. For example, the mixing processing unit 232 can composite a high-frequency emphasized image at a mixing ratio set for each plane in relation to each plane of the demosaiced image. Here, it is possible to set the mixing ratio for a number of planes to zero. That is, the mixing processing unit 232 can selectively add the high-frequency emphasized image to some planes selected from two or more planes that the demosaiced image has, and need not add the high-frequency emphasized image to the remaining planes.

In the present embodiment, the mixing processing unit 232 uses a high-frequency component image that the difference image processing unit 223 generates as a high-frequency emphasized image. The mixing processing unit 232 in the present embodiment generates an output image by adding the high-frequency component image only to the Y plane of the demosaiced image. Here, correction of the U plane and the V plane is not performed. In this fashion, by adding the high-frequency emphasized image to only the Y plane, it is possible to maintain sharpness well while reducing noise. When considering the characteristic of visual perception of humans, the negative effect that the presence of a noise component has on the aesthetic property is smaller in the Y plane which represents the luminance information, while it is larger in the UV plane which represents color difference information. Also, the positive effect that signal sharpness (that the edge component is large) has on aesthetics is larger in the Y plane and smaller in the UV plane. Accordingly, by adding the high-frequency emphasized image including the edge component and the noise component only to the Y plane, it is possible to improve the positive influence that the edge component has on the image while inhibiting the negative effect that the noise component has on the image.

Figure 5:
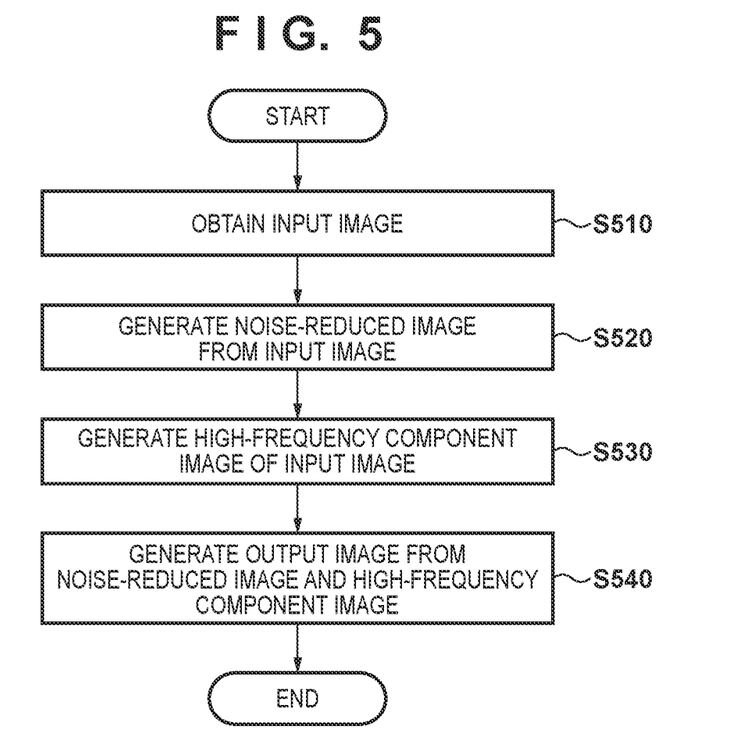
FIG. 5 is a flowchart for an image processing method according to one embodiment.
Figure 6A:
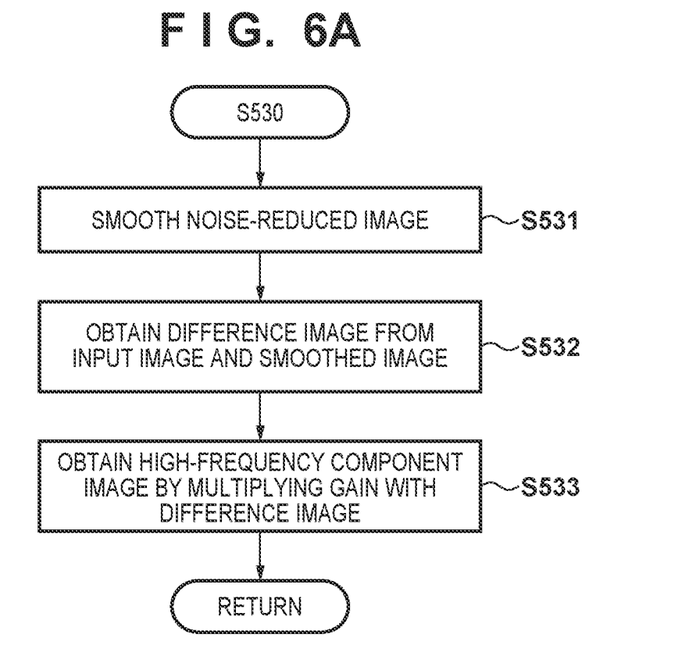
FIGS. 6A and 6B area flowchart for an image processing method according to one embodiment.
Figure 6B:
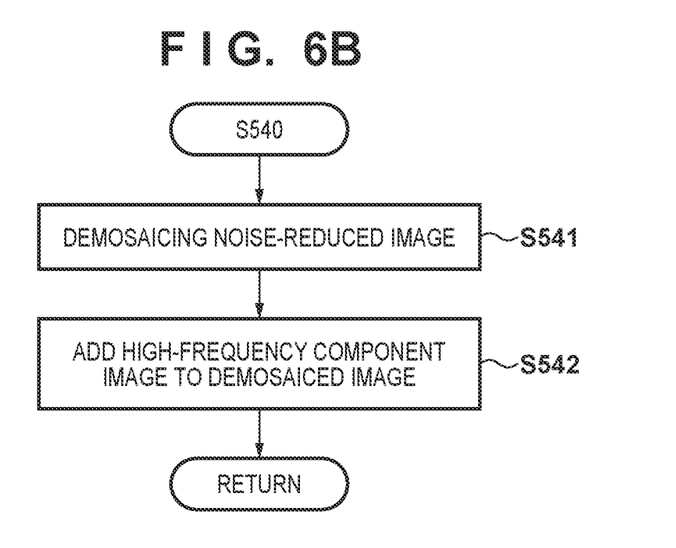

Below, with reference to the flowchart of FIGS. 5 and 6, the flow of an image processing method according to the present embodiment will be described. In step S510, the noise reduction unit 210 reads the input image 200. In step S520, the noise reduction unit 210 obtains the noise-reduced image by reducing the noise of the input image 200 as described above.

In step S530, the extraction unit 220, based on the input image 200 and the noise-reduced image, obtains the high-frequency component image. FIG. 6A illustrates the detailed processing flow of step S530. In step S531, the smoothing processing unit 221 smooths the noise-reduced image as described above. In step S532, the difference image generation unit 222 obtains a difference image by subtracting an image resulting from smoothing processing from the input image 200 as described above. In step S533, the difference image processing unit 223 obtains a high-frequency component image by multiplying the gain value set for each pixel with the difference image as described above.

In step S540, the image generation unit 230 generates the output image. FIG. 6B illustrates the detailed processing flow of step S540. In step S541, the demosaicing processing unit 231, by performing demosaicing processing on the noise-reduced image as described above, obtains a demosaiced image of the YUV format. In step S542, the mixing processing unit 232 generates an output image by adding a high-frequency component image to the Y plane of the demosaiced image as described above.

In the present embodiment as described above, by correcting a demosaiced image resulting from noise reduction processing by using the high-frequency emphasized image including an edge component of the input image, it is possible to reduce noise while maintaining the sharpness of the input image. In the present embodiment, it is possible to improve the sharpness of an output image by performing correction using a high-frequency emphasized image on a demosaiced image obtained by demosaicing processing. A high-frequency component may be lost with the demosaicing processing. By adding the edge component to the image resulting from the demosaicing processing as in the present embodiment, it is possible to increase the edge component amount included in the output image as compared to when the demosaicing processing is performed on an image to which the edge component was added.

Second Embodiment

In the second embodiment, a further process of correcting is performed when generating the high-frequency emphasized image. For example, in the first embodiment, a high-frequency component image is obtained by multiplying a gain value for each pixel with the difference image. Meanwhile, since the amplitude of the pixel value of the difference image differs depending on the existence or absence of an edge or the like, there may be a large difference in amplitude of the difference image for a subject of the same brightness. Also, in the case where capturing is performed using a sensor, noise that is dependent upon the amount of light overlaps the captured image. Accordingly, in a bright portion whose amount of noise is large, there is the possibility that a large amount of noise of the amplitude will be mixed into the difference image. Furthermore, there is a tendency for contrast to become lower in an image of a dark subject in a natural image. Noise reduction processing to an image having low contrast is not easy, and there is a tendency for the sharpness of the image to greatly drop when noise reduction processing is performed sufficiently. In the second embodiment, when a high-frequency emphasized image is generated, the sharpness or the aesthetic property of the image obtained by noise reduction processing is caused to increase by performing an appropriate correction process for each pixel.

Below, techniques for handling noise generated dependent upon the brightness of a subject and a reduction in the sharpness of an image according to the brightness of the subject will be described mainly. However, it is not necessary to employ both of these. Also, for each pixel of the high-frequency emphasized image, it is possible to employ a method other than performing a correction according to the brightness of the subject corresponding to the pixel. In such a case, it is possible to employ nonlinear processing so that the sharpness or the aesthetic property of the output image improves.

A configuration of the image processing apparatus according to a second embodiment is similar to that of the first embodiment, but the processing and configuration of the difference image processing unit 223 is different. Below, the description will focus on points that differ from the first embodiment, and parts that are common to the first embodiment will be omitted.

Figure 7:
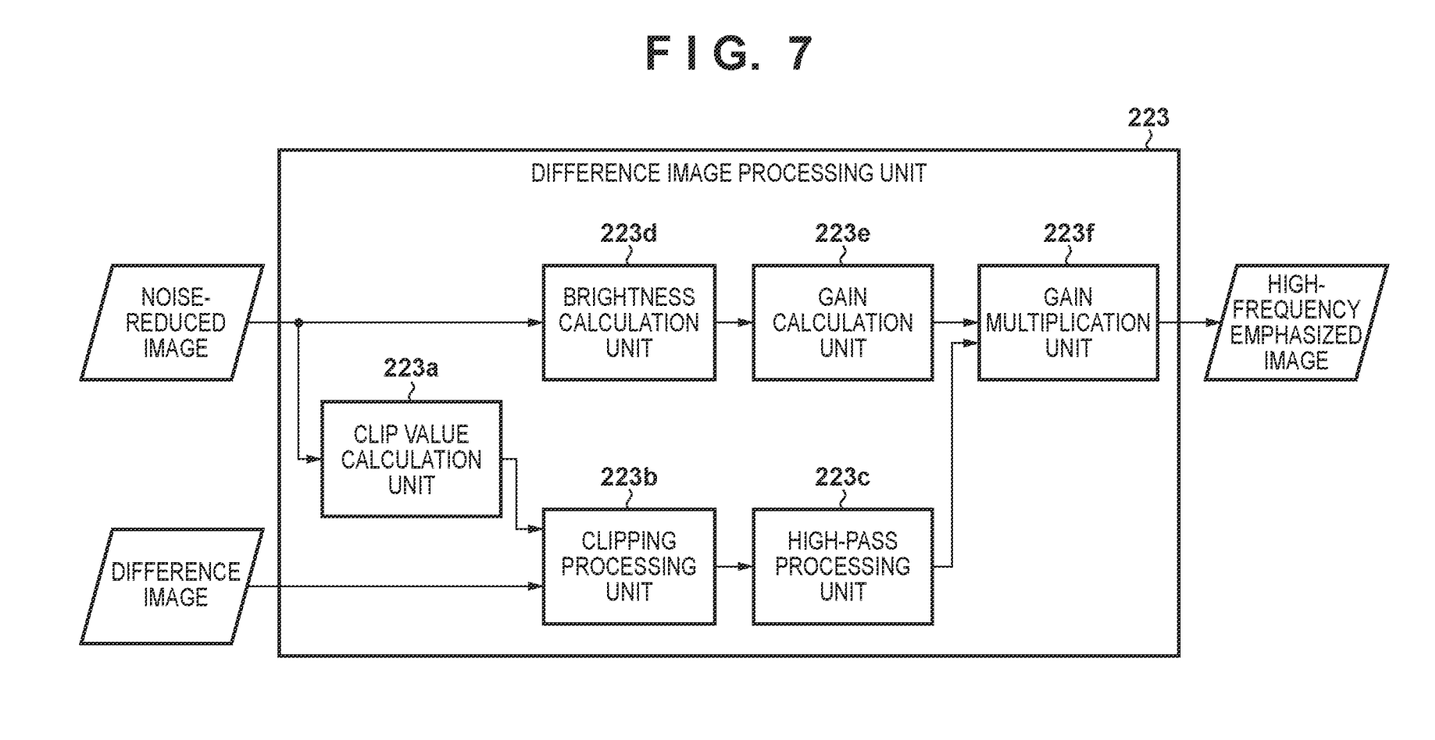
FIG. 7 is a view illustrating an example of a functional configuration of an image processing apparatus according to one embodiment.

In the present embodiment, the noise-reduced image is inputted into the difference image processing unit 223 in addition to the difference image. Also, the difference image processing unit 223 according to the present embodiment has, as configurations for handling noise that occurs dependent upon the brightness of the subject, a clip value calculation unit 223a and a clipping processing unit 223b as illustrated in FIG. 7. The difference image processing unit 223 may also have a high-pass processing unit 223c. Furthermore, the difference image processing unit 223 has a brightness calculation unit 223d, a gain calculation unit 223e, and a gain multiplication unit 223f as configurations for handling a reduction in sharpness according to the brightness of the subject, as illustrated in FIG. 7.

The clip value calculation unit 223a calculates a clip value ClipValue according to the brightness of the subject. As described above, the amount of noise is thought to depend on the amount of light that enters the sensor, in other words the brightness of the subject. Also, the brightness of the subject can be obtained by referencing a noise-reduced image or the input image 200. In the present embodiment, the clip value calculation unit 223a, by applying Equations (5) and (6) to a pixel value I of a pixel corresponding to the noise-reduced image, can obtain a clip value ClipValue for each pixel applied to the difference image.

$$\sigma = \sqrt{(K \times (I - I0))} \quad (5)$$

$$ClipValue = R \times \sigma \quad (6)$$

In Equation (5), K and 10 represent noise characteristics of the sensor that captured the input image 200. Parameters that represent these noise characteristics can be estimated in advance by performing an operation (processing) such as capturing a chart for noise evaluation and analyzing the result. σ represents standard deviation of noise for each pixel. R is a parameter for adjusting the clip value, and can be decided in advance.

The clipping processing unit 223b, for each pixel of the high-frequency emphasized image, performs processing for limiting the pixel value to a range according to the brightness of the subject corresponding to the pixel. The specific method for limiting the pixel value is not particularly limited, and for example, the clipping processing unit 223b may change a pixel value that is outside of the range according to the brightness of the subject corresponding to the pixel to an upper limit value or a lower limit value, which define the range, for each pixel of the high-frequency emphasized image. In the present embodiment, the clipping processing unit 223b obtains a post-clipping image dc by clipping the difference image based on the clip value ClipValue that the clip value calculation unit 223a obtained. The post-clipping image obtained in this way corresponds to a high-frequency emphasized image resulting from the high-frequency component of the input image 200 being emphasized. The clipping processing unit 223b can perform processing in accordance with Equation (7). In Equation (7), d represents a pixel value of a difference image.

$$dc = \begin{cases} -ClipValue & d < -ClipValue \\ d & -ClipValue \leq d \leq ClipValue \\ ClipValue & ClipValue < d \end{cases} \quad (7)$$

In this fashion, the clipping processing unit 223b performs nonlinear processing for limiting pixel values of the post-clipping image to the range from −ClipValue to +ClipValue which is defined in accordance with the brightness of the subject. By such a configuration, it is possible to inhibit large noise of an amplitude that exceeds this range and inhibit the occurrence of noise (salt-and-pepper noise) of a dot pattern after adding the high-frequency emphasized image to the noise-reduced image. In particular, in the present embodiment, by making this range smaller the darker the subject is, it is possible to inhibit noise in dark regions effectively.

Figure 8:
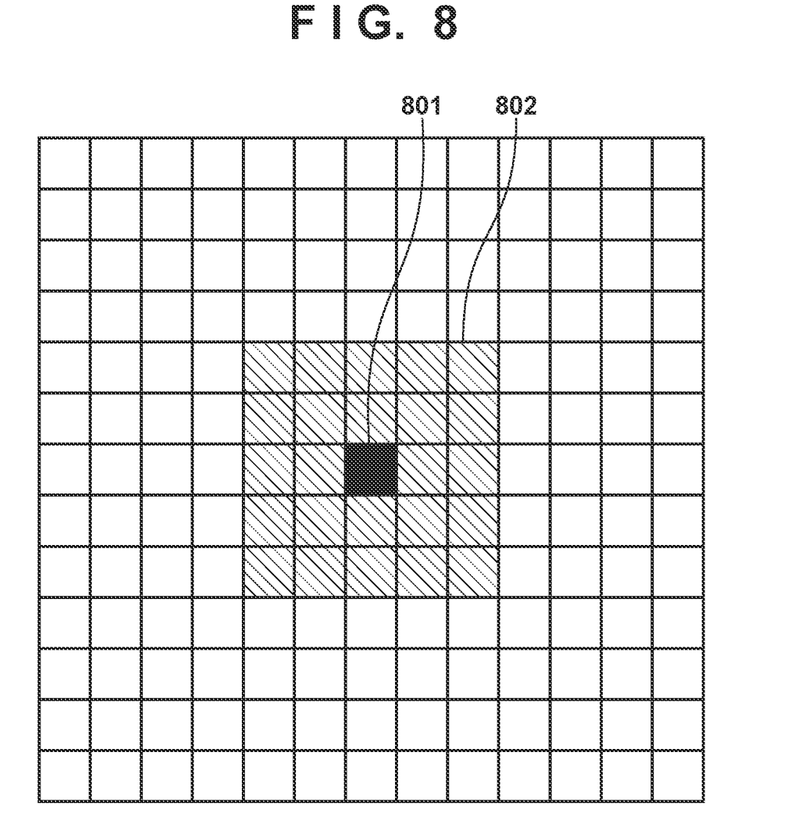
FIG. 8 is a view for describing an example of smoothing processing.

The difference image processing unit 223 may have the high-pass processing unit 223c, though this is not required. The high-pass processing unit 223c obtains a high-pass image by extracting a high-frequency component by performing high-frequency emphasis processing (high-pass processing) to the post-clipping image dc. The high-pass image obtained in this way corresponds to a high-frequency emphasized image resulting from the high-frequency component of the input image 200 being emphasized. The high-pass processing unit 223c performs smoothing processing to the post-clipping image dc, for example, and can obtain a high-pass image by subtracting the image obtained by the smoothing processing from the post-clipping image dc. In the smoothing processing, as illustrated in FIG. 8, it is possible to use a filter (usually called an average value filter) for obtaining an average value of the pixel values in a region 802 of a predetermined size in the vicinity in relation to a center pixel 801. Also, smoothing may be performed by a conversion process such as a two-dimensional Fourier transform/low-frequency mask/two-dimensional inverse Fourier transform. By virtue of this kind of high-pass processing, it is expected that the ratio of the high-frequency component in the high-frequency emphasized image will increase, and that the aesthetic property after the high-frequency emphasized image is added to the noise-reduced image will increase. Note that the high-pass processing unit 223c may generate a high-pass image by extracting a high-frequency component by performing high-pass processing to a difference image.

The difference image processing unit 223 can generate a high-frequency component image by multiplying a gain value set for each pixel similarly to in the first embodiment with a post-clipping image or a high-pass image thus obtained. Meanwhile, in the present embodiment, the gain multiplication unit 223f, in the following way, multiplies a gain value according to the brightness of the subject with the post-clipping image or the high-pass image.

The brightness calculation unit 223d determines the brightness of the subject corresponding to each pixel. The brightness of the subject can be obtained by referencing the noise-reduced image or the input image 200. In the present embodiment, the brightness calculation unit 223d calculates the luminance value of the pixel corresponding to the noise-reduced image as the brightness of the subject. Specifically, the brightness calculation unit 223d can calculate the Y value obtained by performing similar processing to the demosaicing processing unit 231 as the luminance value.

The gain calculation unit 223e, based on the brightness of the subject corresponding to each pixel that the brightness calculation unit 223d determines, calculates the gain value. The gain calculation unit 223e, based on the brightness of the subject for each pixel, can calculate the gain value for each pixel. In the present embodiment, the gain calculation unit 223e, by multiplying a white balance coefficient similar to in the first embodiment with a coefficient set for each pixel, calculates the gain value. This coefficient is defined for each pixel so as to become smaller the larger the luminance value that the calculated brightness calculation unit 223d is, and to become larger the smaller the luminance value is. That is, for the same color pixel, the gain value is set larger the darker the subject is.

The gain multiplication unit 223f generates the high-frequency component image by correcting the high-pass image (or the post-clipping image) that the high-pass processing unit 223c generated using the gain value that the gain calculation unit 223e calculated. Specifically, the gain multiplication unit 223f, in relation to the pixel value of each pixel of the high-pass image, can multiply the gain value corresponding to this pixel. That is, in the present embodiment, a larger gain is applied to a darker subject part of the high-frequency emphasized image. As described previously, given that the sharpness of a dark subject tends to degrade by noise reduction processing, it is possible to improve the sharpness by strongly recovering the high-frequency component of a darker subject by adding the high-frequency emphasized image to a noise-reduced image by virtue of such a configuration.

Figure 9:
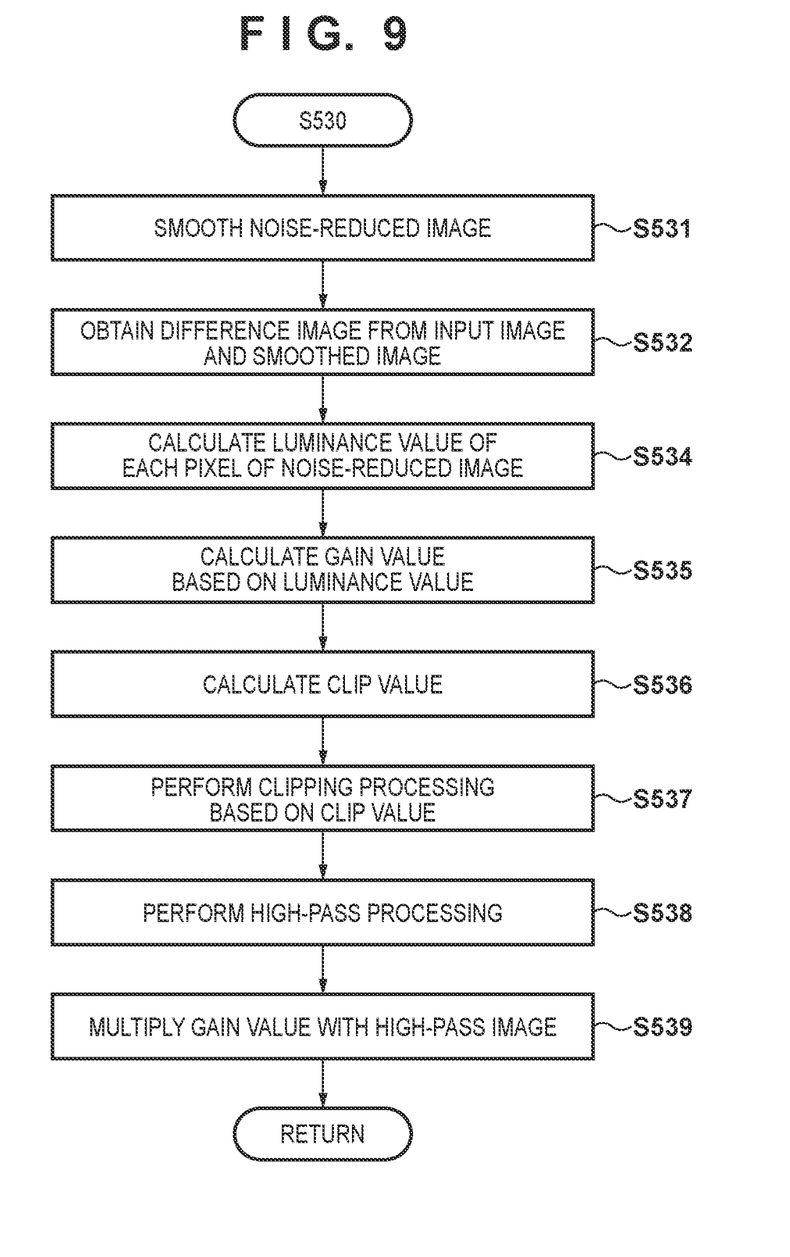
FIG. 9 is a flowchart for an image processing method according to one embodiment.

Below, with reference to the flowcharts of FIGS. 5 and 9, an image processing method flow according to the present embodiment will be described.

The processing of steps S510, S520, and S540 is similar to in the first embodiment. FIG. 9 illustrates a detailed processing flow of step S530. The processing of steps S531 and S532 is similar to in the first embodiment. In step S533, the brightness calculation unit 223d calculates the luminance value of each pixel as described above. The gain calculation unit 223e in step S534, as described above, calculates the gain value based on the luminance value calculated in step S533. In step S535, the clip value calculation unit 223a calculates the clip value based on the noise-reduced image as described above. In step S536, the clipping processing unit 223b obtains the post-clipping image by performing clipping processing based on the clip value to the difference image as described above. In step S537, the high-pass processing unit 223c obtains the high-pass image by performing high-pass processing to a post-clipping image as described above. In step S538, the gain multiplication unit 223f obtains the high-frequency component image by multiplying the gain value with the high-pass image as described above.

As described above, by virtue of the present embodiment, even in a case where noise of different standard deviations is included in each pixel in an input image dependent upon the brightness of the subject, it is possible to further increase image quality by performing clipping processing that is based on a predicted amount of noise.

Other Embodiments

In the above-described embodiments, each function of the image processing apparatus illustrated in FIG. 2 or the like is realized by the computer. However, some or all of the functions that the image processing apparatus has may be realized by dedicated hardware or an image processing circuit. An image processing apparatus according to one embodiment of the present invention may be constituted by a plurality of information processing apparatuses connected to each other via, for example, a network.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-211709, filed Nov. 22, 2019, which is hereby incorporated by reference herein in its entirety.

What is claimed is:

1. An image processing apparatus, comprising:
   one or more processors;
   one or more memories that store computer-readable instructions for causing, when executed by the one or more processors, the communication apparatus to function as:
      a noise reduction unit configured to generate a noise-reduced image in which noise is reduced from an input image in which a plurality of types of pixels that represent mutually different types of color information are arranged in one plane;
      an extraction unit configured to generate a high-frequency emphasized image in which a high-frequency component of the input image is emphasized;
      a demosaicing unit configured to generate a demosaiced image having a plurality of planes that each represent one type of color information by demosaicing processing to the noise-reduced image; and
      a generation unit configured to generate an output image by correcting the demosaiced image by using the high-frequency emphasized image,
   wherein the extraction unit is further configured to generate the high-frequency emphasized image from a difference image between the input image and an image obtained by a filter process to the noise-reduced image.

2. The image processing apparatus according to claim 1, wherein the generation unit is further configured to, to each plane of the demosaiced image, mix the high-frequency emphasized image by a mixing ratio set for each plane.

3. The image processing apparatus according to claim 1, wherein the generation unit is further configured to, selectively to a plane subset selected from the plurality of planes that the demosaiced image has, add the high-frequency emphasized image.

4. The image processing apparatus according to claim 1, wherein the generation unit is further configured to, selectively to a plane representing luminance information that the demosaiced image has, add the high-frequency emphasized image.

5. The image processing apparatus according to claim 1, wherein the input image is an image of a Raw format.

6. The image processing apparatus according to claim 1, wherein the input image is a Bayer image.

7. The image processing apparatus according to claim 1, wherein the extraction unit is further configured to generate the high-frequency emphasized image from a difference image between the input image and the noise-reduced image.

8. The image processing apparatus according to claim 7, wherein the extraction unit is further configured to generate the high-frequency emphasized image by extracting a high-frequency component of the difference image.

9. The image processing apparatus according to claim 1, wherein
the pixel values of the plurality of types of pixels are obtained by image capturing pixels having mutually different spectral sensitivity characteristics; and
the extraction unit is further configured to perform a correction according to a type of the pixel for each pixel of the high-frequency emphasized image.

10. The image processing apparatus according to claim 9, wherein
the plurality of types of pixels includes an R pixel, a G pixel, and a B pixel, and
the extraction unit is further configured to perform a correction that multiplies a white balance coefficient according to a type of the pixel with a pixel value of each pixel of the high-frequency emphasized image.

11. The image processing apparatus according to claim 1, wherein the extraction unit is further configured to perform a correction according to a brightness of a subject of the pixel for each pixel of the high-frequency emphasized image.

12. The image processing apparatus according to claim 1, wherein the extraction unit is further configured to perform processing for limiting a pixel value to a range according to a brightness of a subject at the pixel for each pixel of the high-frequency emphasized image.

13. The image processing apparatus according to claim 12, wherein the extraction unit is further configured to, for each pixel of the high-frequency emphasized image, set the range according to the brightness of the subject at the pixel based on a pixel value corresponding to the input image or the noise-reduced image.

14. The image processing apparatus according to claim 1, wherein the extraction unit is further configured to, to a pixel value of a pixel of the high-frequency emphasized image at which a corresponding subject is darker, perform a correction that applies a larger gain.

15. An image processing apparatus comprising:
one or more processors;
one or more memories that store computer-readable instructions for causing, when executed by the one or more processors, the communication apparatus to function as:
a noise reduction unit configured to generate a noise-reduced image in which noise is reduced from an input image in which a plurality of types of pixels that represent mutually different types of color information are arranged in one plane;
an extraction unit configured to generate a high-frequency emphasized image in which a high-frequency component of the input image is emphasized;
a demosaicing unit configured to generate a demosaiced image having a plurality of planes that each represent one type of color information by demosaicing processing to the noise-reduced image; and
a generation unit configured to generate an output image by correcting the demosaiced image by using the high-frequency emphasized image,
wherein the extraction unit is further configured to generate the high-frequency emphasized image from a difference image between the input image and an image obtained by nonlinear processing for attenuating a high-frequency component to the noise-reduced image.

16. An image processing method, comprising:
generating a noise-reduced image in which noise is reduced from an input image in which a plurality of types of pixels that represent mutually different types of color information are arranged in one plane;
generating a high-frequency emphasized image in which a high-frequency component of the input image is emphasized;
generating a demosaiced image having a plurality of planes that each represent one type of color information by demosaicing processing to the noise-reduced image; and
generating an output image by correcting the demosaiced image by using the high-frequency emphasized image,
wherein the high-frequency emphasized image is generated from a difference image between the input image and an image obtained by a filter process to the noise-reduced image.

17. A non-transitory computer-readable medium storing a program which, when executed by a computer, causes the computer to perform a method comprising:
generating a noise-reduced image in which noise is reduced from an input image in which a plurality of types of pixels that represent mutually different types of color information are arranged in one plane;
generating a high-frequency emphasized image in which a high-frequency component of the input image is emphasized;
generating a demosaiced image having a plurality of planes that each represent one type of color information by demosaicing processing to the noise-reduced image; and
generating an output image by correcting the demosaiced image by using the high-frequency emphasized image,
wherein the high-frequency emphasized image is generated from a difference image between the input image and an image obtained by a filter process to the noise-reduced image.

* * * * *